(12) United States Patent
Schnell

(10) Patent No.: US 6,168,279 B1
(45) Date of Patent: Jan. 2, 2001

(54) PIVOT SUPPORT FOR ADJUSTABLE REARVIEW MIRROR

(75) Inventor: Robert E. Schnell, Zeeland, MI (US)

(73) Assignee: Donnelly Corporation, Holland, MI (US)

(*) Notice: Under 35 U.S.C. 154(b), the term of this patent shall be extended for 0 days.

(21) Appl. No.: 09/047,846

(22) Filed: Mar. 25, 1998

(51) Int. Cl.$^7$ .................................................. G02B 7/182
(52) U.S. Cl. .......................... 359/872; 359/877; 248/481; 74/502.1
(58) Field of Search .................... 359/872, 877; 248/477, 478, 481, 483; 74/500.5, 502.1

(56) References Cited

U.S. PATENT DOCUMENTS

| | | | |
|---|---|---|---|
| Re. 34,142 | 12/1992 | Fimeri | 74/89.14 |
| 3,818,780 | 6/1974 | McIntrye et al. | 74/501 |
| 3,917,212 | 11/1975 | Hadley et al. | 248/487 |
| 3,918,319 | 11/1975 | Mills | 74/491 |
| 3,966,162 | 6/1976 | Hadley | 248/487 |
| 4,003,271 | 1/1977 | Stelma | 74/501 |
| 4,116,538 | 9/1978 | Oskam . | |
| 4,158,483 | 6/1979 | Fisher et al. . | |
| 4,167,306 | 9/1979 | Longland . | |
| 4,189,956 | 2/1980 | Brubaker | 74/501 |
| 4,250,767 | 2/1981 | Bottrill | 74/501 |
| 4,401,289 | 8/1983 | Fisher et al. | 248/483 |
| 4,555,166 | 11/1985 | Enomoto . | |
| 4,628,760 | 12/1986 | Huddleston | 74/501 |
| 4,876,911 | * 10/1989 | Kurihara | 74/502.1 |
| 4,915,493 | 4/1990 | Fisher et al. . | |
| 4,918,920 | 4/1990 | Duroux | 60/536 |
| 4,988,179 | 1/1991 | Stensland . | |
| 5,170,288 | 12/1992 | Imaizumi et al. | 359/507 |
| 5,305,144 | 4/1994 | Mori et al. | 359/507 |
| 5,331,471 | 7/1994 | Gilbert | 359/874 |
| 5,568,326 | * 10/1996 | Yoshida et al. | 359/872 |
| 5,838,507 | * 11/1998 | Boddy et al. | 359/877 |
| 5,946,151 | * 8/1999 | Levko | 359/872 |

FOREIGN PATENT DOCUMENTS

| | | |
|---|---|---|
| 3148525A1 | 6/1983 | (DE) . |
| 186366A2 | 7/1986 | (EP) . |
| 289149A1 | 11/1988 | (EP) . |
| 292147A2 | 11/1988 | (EP) . |
| 458480A2 | 11/1991 | (EP) . |

\* cited by examiner

Primary Examiner—Cassandra Spyrou
Assistant Examiner—Mark A. Robinson
(74) Attorney, Agent, or Firm—Van Dyke, Gardner, Linn & Burkhart, LLP

(57) ABSTRACT

An adjustable support for a reflective mirror element in a housing of a rearview mirror assembly provides improved control and more uniform movement of the reflective element. The adjustable support includes an adapter member, which supports the reflective element, a fixed member, and at least one member urging the adapter member into bearing contact with the fixed member. One of the adapter member and the fixed member includes an arcuate bearing surface, for example a semi-spherical bearing surface, and the other of the adapter member and the fixed member includes an annular line bearing surface which engages on the arcuate surface forming an annular line bearing contact between the adapter member and the fixed member to permit adjustment of a reflective mirror element in the housing. The adjustable support may comprise a handset with adjustable support, a remotely manual adjustable support, or an electrically actuated electrical adjustable support. Preferably, the line bearing contact is provided by a cylindrical member which extends from one of the adapter member and the fixed member with a line bearing surface being defined by the distal or free end of the cylindrical member.

59 Claims, 10 Drawing Sheets

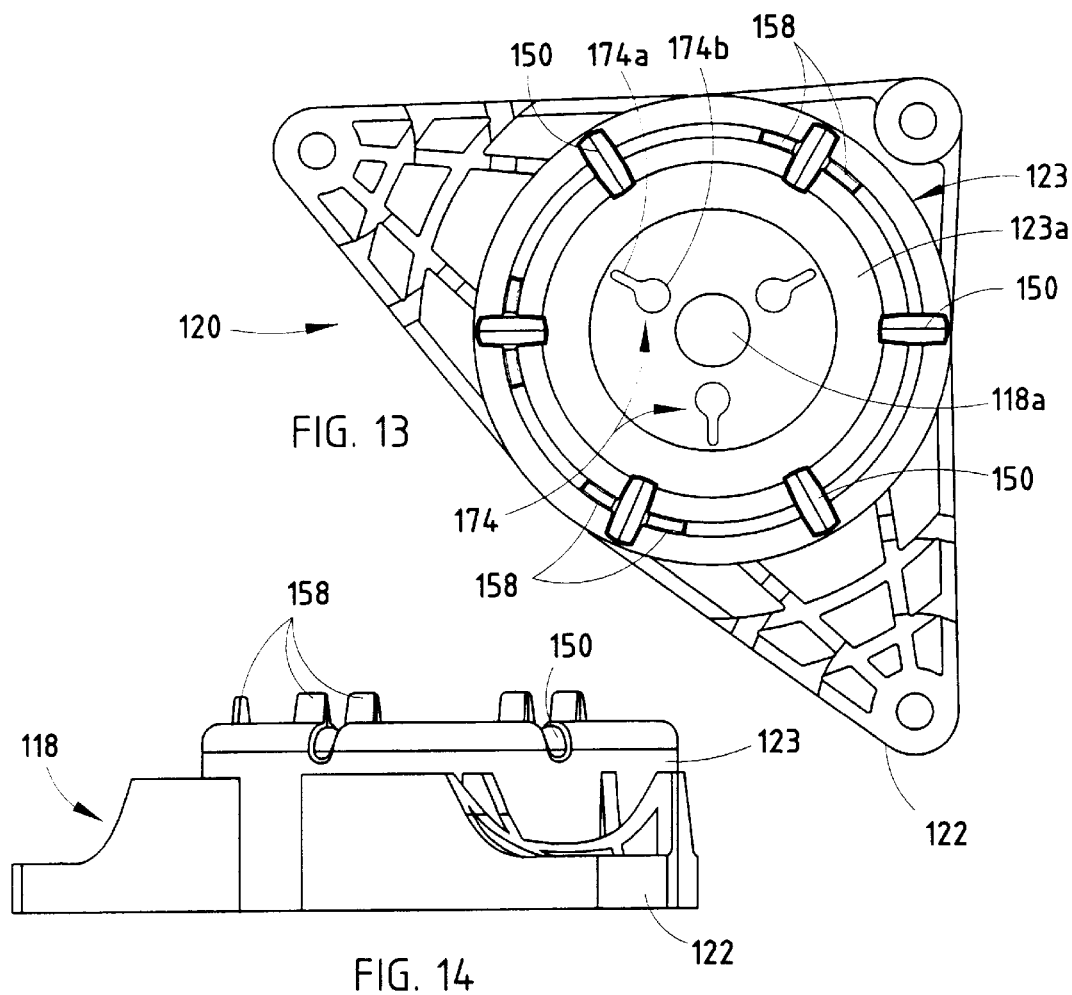
FIG. 13
FIG. 14
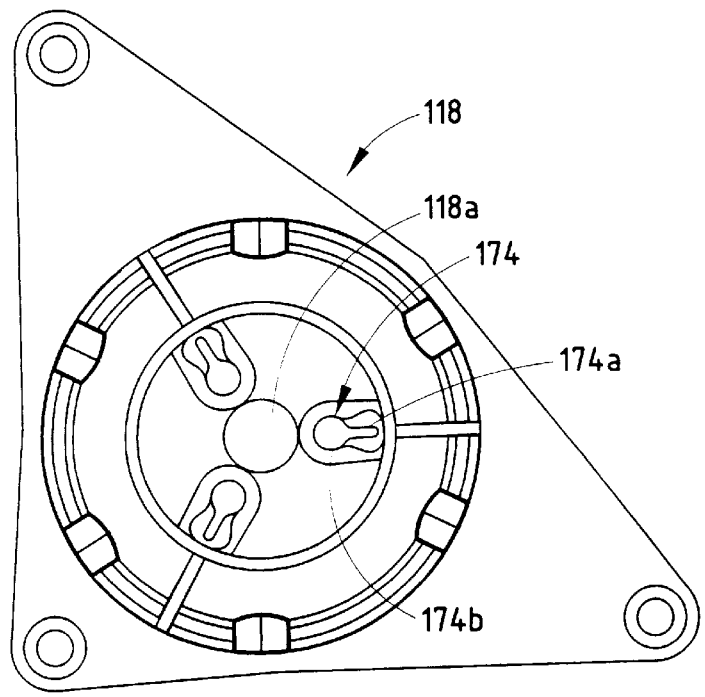
FIG. 15

PIVOT SUPPORT FOR ADJUSTABLE REARVIEW MIRROR

TECHNICAL FIELD AND BACKGROUND OF THE INVENTION

The present invention relates a reflective mirror support which is used in vehicles to adjust the position of a reflective mirror element in a rearview mirror assembly housing. More particularly, the present invention relates to a pivotable support which permits multi-axis positioning of the reflective mirror element within the housing.

Conventional adjustable rearview mirror assemblies, and especially exterior rearview mirror assemblies, include an adapter and/or backing plate, on which a reflective element is mounted, and a fixed base, such as a manual actuator or an electrical actuator assembly. The fixed base or electrical actuator assembly is mounted in a fixed position on a bracket in the mirror assembly housing. Typically, the adapter plate includes a spherical structure which cooperates with a corresponding spherical socket structure on the fixed base or the electrical actuator housing, to provide a ball and socket type adjustable connection. In this manner, the adapter plate and reflective mirror element are pivotal about a plurality of axes passing through the centroid of the ball and socket connection to allow multi-axis positioning of the reflective mirror element.

However, these prior known ball and socket connections often exhibit nonuniform movement of the reflective element. This non-uniform movement occurs because of irregular and unpredictable contact between the moving component parts of the adjustable support. This unpredictable contact also causes the magnitude of the actuating forces to vary which leads to poor control over the movement of the reflective element. In some instances, this unpredictable contact may even lead to the adapter plate binding with the fixed base or electrical actuator housing.

In order to achieve more uniform contact between these two spherical bearing surfaces and, therefore, increased control over the positioning of the reflective element, prior rearview mirror supports have attempted to carefully match the respective spherical surfaces of the component parts which requires tight, highly precise, molding tolerances. Tight molding tolerances, however, significantly, increase the cost of production. Alternatively, attempts have been made to lubricate the respective spherical surfaces of the component parts to alleviate the impact of the surface to surface variations. However, over time, such lubrication can break down.

Consequently, there is a need for an adjustable support for a reflective mirror element in a rearview mirror assembly that will exhibit increased control over the positioning of the reflective element, and more uniform movement, and will not require the tight molding tolerances associated with the dual spherical surfaces of the conventional, prior known adjustable supports, and yet is adaptable for use in either manually, manually remote operated or electrically operated rearview mirror assemblies.

SUMMARY OF THE INVENTION

Accordingly, the present invention provides an improved reflective mirror element support, especially suited for exterior rearview mirror assemblies, which includes an improved pivotal connection between an adapter member and a fixed base. The adapter member and fixed base of the present invention are easier to mold and provide increased control over the relative movement of the adapter member with respect to the fixed base.

According to one aspect of the invention, an adjustable support for a reflective element in a rearview mirror assembly includes an adapter member which is adapted to support the reflective element, a fixed member, and at least one connecting member urging the adapter member into bearing contact with the fixed member. One of the adapter member and the fixed member includes an arcuate bearing surface, and the other of the adapter member and the fixed member includes an annular line bearing surface, which bears on the arcuate bearing surface and forms an annular line bearing contact between the adapter member and the fixed member to permit adjustment of the position of the reflective element.

In one form, the annular line bearing surface is defined by a cylindrical member, preferably by the distal end of the cylindrical member. Further, one of the adapter member and the fixed member includes at least one projecting member and the other of the adapter member and the fixed member includes a corresponding recess. The projecting member cooperates with the corresponding recess to limit the relative rotation of the adapter member about a first axis of the fixed member but permits the adapter member to rotate about a second axis of the fixed member, where the first axis is generally orthogonal to the second axis. For example, the projecting member may comprise a rib.

In other forms, one of the adapter member and the fixed member includes a plurality of projecting members, in which case the other of the adapter member and the fixed member includes a plurality of corresponding recesses. Preferably, the projecting members are arranged in a spaced-apart radial arrangement, preferably on the back side of the adapter member. In other forms, the fixed member includes a cylindrical member extending toward the adapter member. The cylindrical member defines the arcuate bearing surface and also includes the plurality corresponding recesses. The cylindrical member may be defined by an annular wall, with the corresponding recesses being formed in the annular wall.

In another form, the fixed member comprises an electrical actuator housing, which provides remote adjustment of the reflective element within the rearview mirror assembly.

In yet another form, the adapter member is urged toward the fixed member by a plurality of cables, which extend through the adapter member and fixed member to an actuator. At one end, the cables are secured to the adapter member, and their other ends are secured to the actuator, which provides remote manual adjustment of the orientation of the reflective mirror element in the exterior mirror assembly.

Thus, by reducing the contact between the adapter member and the fixed member to a line bearing contact an adjustable support for a reflective mirror element is disclosed that exhibits predictable and uniform contact between its moving parts. Consequently, the adjustable support exhibits increased control over the positioning of the reflective element and provides more consistent movement. Moreover, the adjustable support of the present invention eliminates the need for tight molding tolerances associated with the spherical to spherical contact of conventional adjustable supports and, yet, is adaptable for use in manually remote operated, and electrically operated rear view mirror assemblies. In addition, with proper material selection, no secondary lubricant applications are necessary with the present invention. Therefore, the adjustable support of the present invention is less costly to manufacture.

These and other objects, advantages, purposes and features of the invention will become more apparent from a study of the following description taken in conjunction with the drawings.

DESCRIPTION OF THE DRAWINGS

FIG. 13 is a top plan view of a fixed base of the adjustable support of FIG. 16;

FIG. 14 is a side elevation of the fixed base of FIG. 13;

FIG. 15 is a rear elevation of the fixed base of the manually adjustable support of FIG. 6;

DESCRIPTION OF THE PREFERRED EMBODIMENTS

Figure 1:
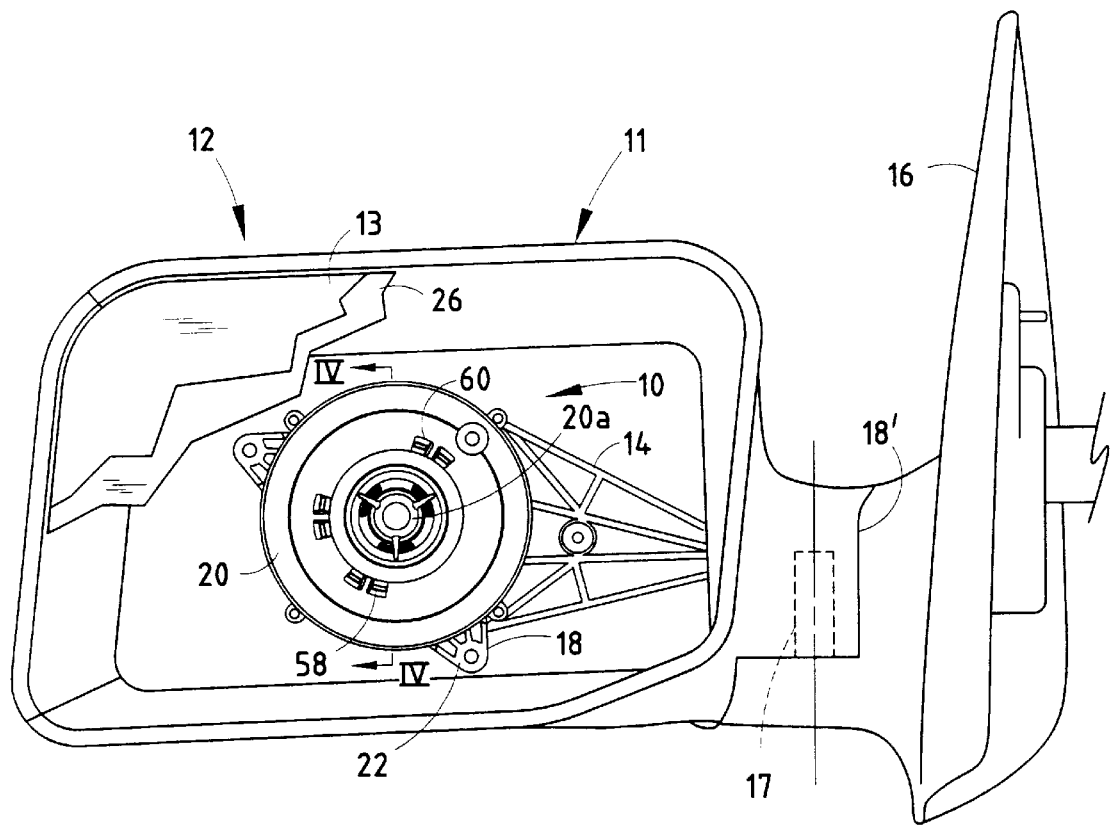
FIG. 1 is a front elevation view of a manually adjustable support for a reflective element of the present invention shown mounted in an exterior rearview mirror assembly.

Referring to FIG. 1, the adjustable support 10 of the present invention is shown mounted in a modular housing 11 of an exterior rearview mirror assembly 12 of a vehicle (not shown). Adjustable support 10 is mounted to a bracket 14 in the housing 11, which in turn is mounted to the modular housing 11. In the illustrated embodiment, housing 11 comprises a break-away housing which is conventionally known in the art. Preferably, housing 11 is pivotally mounted with respect to a vehicle attachment 16 on a pivot member 17 having pivot axis A. Housing 11 separates from attachment 16 along line 18 when struck or impacted such that it folds toward the vehicle attachment 16 and thus toward the vehicle on which it is mounted. It should be understood that adjustable support 10 can also be mounted in a fixed position, exterior mirror assembly housing. Adjustable support 10 supports the mirror or reflective element 13 in modular housing 11 and provides multi-axis positioning of reflective element 13 in housing 11, as will be more fully described below.

Figure 2:
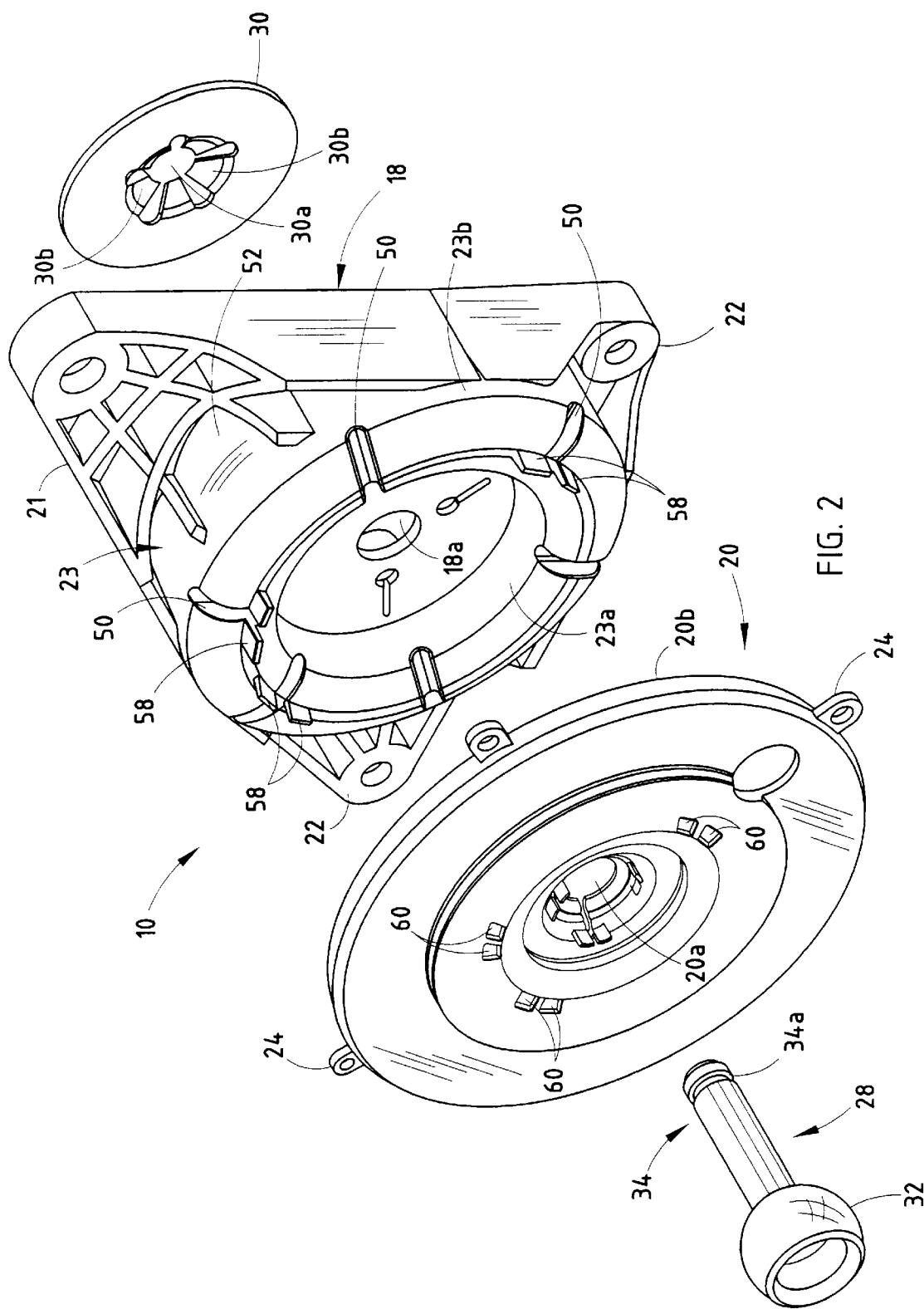
FIG. 2 is an exploded perspective view of the adjustable support of FIG. 1.

Referring to FIG. 2, adjustable support 10 includes a fixed member 18 and an adapter member 20. Preferably, fixed member 18 and adapter member 20 are formed from a plastic material, for example poly butylene terepthalate (PBT), such as CALANEX from Ticona of New Jersey, acetal, such as celcan M-90 from Ticona, or nylon or the like. Preferably, fixed member 18 and adapter member 20 are made from dissimilar materials, for example fixed member 18 may be formed from nylon while adapter member 20 would then preferably be formed form either acetal or PBT, in order to reduce noise. Fixed member 18 includes a generally triangular mounting base 21 with a plurality of mounting bosses 22 and a cylindrical member 23. Bosses 22 receive suitable fasteners, such as bolts, screws and the like for mounting fixed member 18 to bracket 14. Cylindrical member 23 includes an annular webbed wall 23b which defines an arcuate bearing surface 23a, for example a semi-spherical bearing surface. Arcuate bearing surface 23a is defined on the inner surface of annular webbed wall 23b and provides a bearing surface on which adapter member 20 can move to form an articulating joint.

Adapter member 20 preferably comprises a plate member with a plurality of mounting tabs or bosses 24 for aligning a reflective element holder or backing plate 26 on which reflective element 13 is mounted. Reflective element holder 26 is preferably inserted to adapter member 20 by snap-fit couplers, which are conventional and known in the rearview mirror art. In the illustrated embodiment, adjustable support 10 comprises a manual or handset actuator support which is adjusted by hand outside of the vehicle by simply applying a force to the peripheral region of reflective element 13 which causes the adapter member 20 to pivot on arcuate bearing surface 23a of fixed member 18 on one or more axes. Mirror reflective element 13, reflective element holder or backing plate 26, and adapter member 20 operate as a unit and pivot about fixed member 18 to provide multi-axis positioning of reflective element 13 within modular housing 11 of exterior rearview mirror assembly 12.

Figure 3:
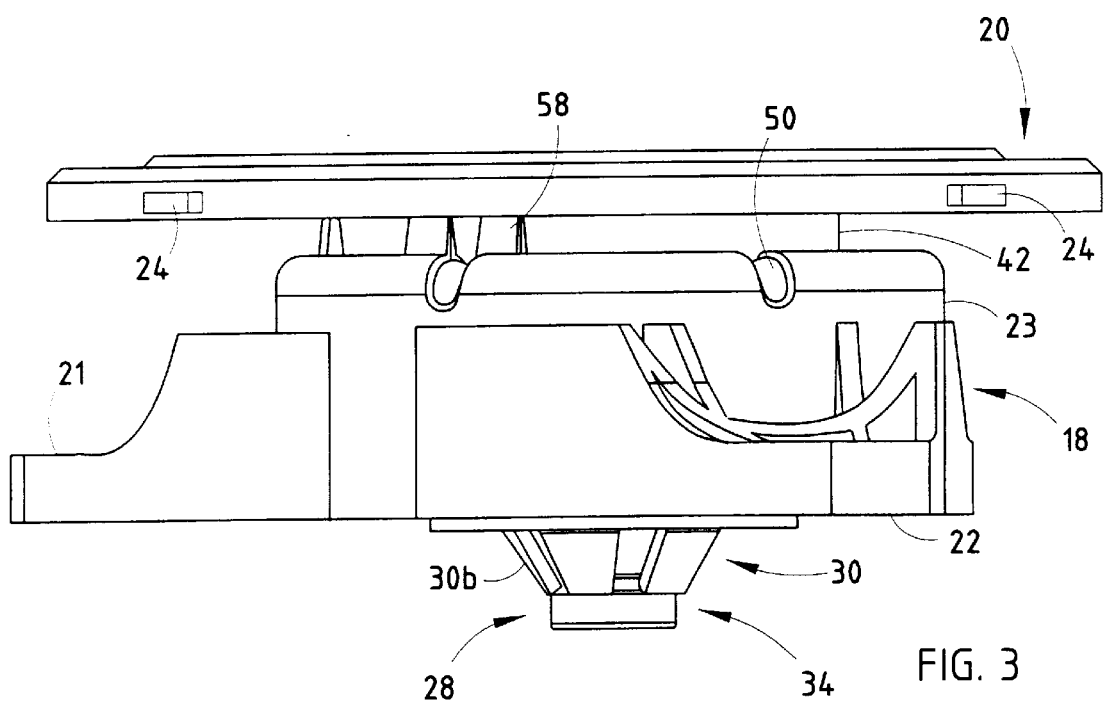
FIG. 3 is a side elevation of the manually adjustable support of FIGS. 1 and 2.
Figure 4:
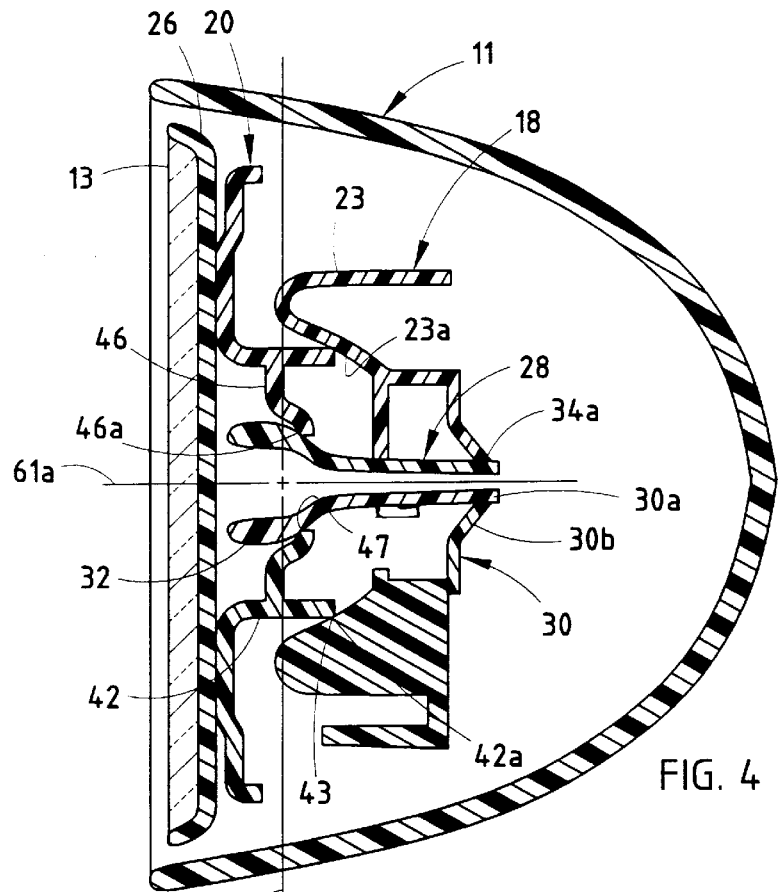
FIG. 4 is a cross-section view taken along line IV—IV of FIG. 1.

As best seen in FIGS. 2–4, adapter member 20 is mounted to fixed base member 18 by a coupler or locking pin 28, which extends through central openings 20a and 18a of adapter member 20 and fixed member 18, respectively, and is held in place by a locking cap 30. Locking pin 28 includes an enlarged spherical distal end 32, which engages adapter member 20, and a grooved second end 34 which extends through adapter member 20 and projects from a rear side of fixed member 18. Grooved second end 34 of locking pin 28 extends through a central opening 30a of locking cap 30, which is defined by a plurality of segmented radially, inwardly extending tabs 30b. Tabs 30b form a spring and are deflected away from fixed member 18 and seat in groove 34a of grooved end 34 of locking pin 28 (FIG. 3) to thereby urge adapter member 20 into bearing contact with fixed member 18.

In order to provide multi-axis positioning of reflective element 13, adapter member 20 includes a cylindrical member 42 which projects from a back side 20b of adapter member 20 and cooperates with arcuate bearing surface 23a of fixed member 18. As best seen in FIG. 4, when locking pin 28 is inserted through the opening 20a of adapter member 20 and central opening 18a of fixed member 18 and grooved distal end 34 is engaged by locking cap 30, cylindrical member 42 is urged toward fixed member 18 and bears on arcuate bearing surface 23a of member 18, which provides an annular line contact between adapter member 20 and fixed member 18. This annular line contact is defined between an outer peripheral edge 42a of cylindrical member 42, which defines an annular line bearing surface 43 on the free end of cylindrical member 42, and arcuate bearing surface 23a of fixed member 18. By reducing the contact area between adapter member 20 and fixed member 18 to a line bearing contact, more predictable contact between adapter member 20 and fixed base 18 is achieved; therefore, increased control over the movement of reflective element 13 is realized.

Furthermore, as best seen in FIG. 4, a central portion 44 of adapter member 20, which includes opening 20a, is recessed to define a recessed annular portion 46 for engaging enlarged distal end 32 of locking pin 28. Preferably, recessed annular portion 46 is reinforced by a plurality of radially extending, reinforcing ribs 46b which are circumferentially spaced around opening 20a and extend outwardly from opening 20a to cylindrical member 42. A free edge 46a of recessed annular portion 46 includes a corner defining an annular line bearing surface 47, which provides an annular line bearing contact between adapter member 20 and enlarged distal end 32 of locking pin 28. In this manner, when a force is applied to reflective element 13 at a position offset from the central portion of reflective element 13, adapter member 20 pivots about a centroid of arcuate bearing surface 23a of fixed member 18 on annular line bearing surface 43 and annular line bearing surface 47. Line bearing surfaces 43, 47 are thus spaced from one another to provide dual annular contacts which provide stable vibration reducing support for mirror element 13 and backing plate 26.

Figure 5:
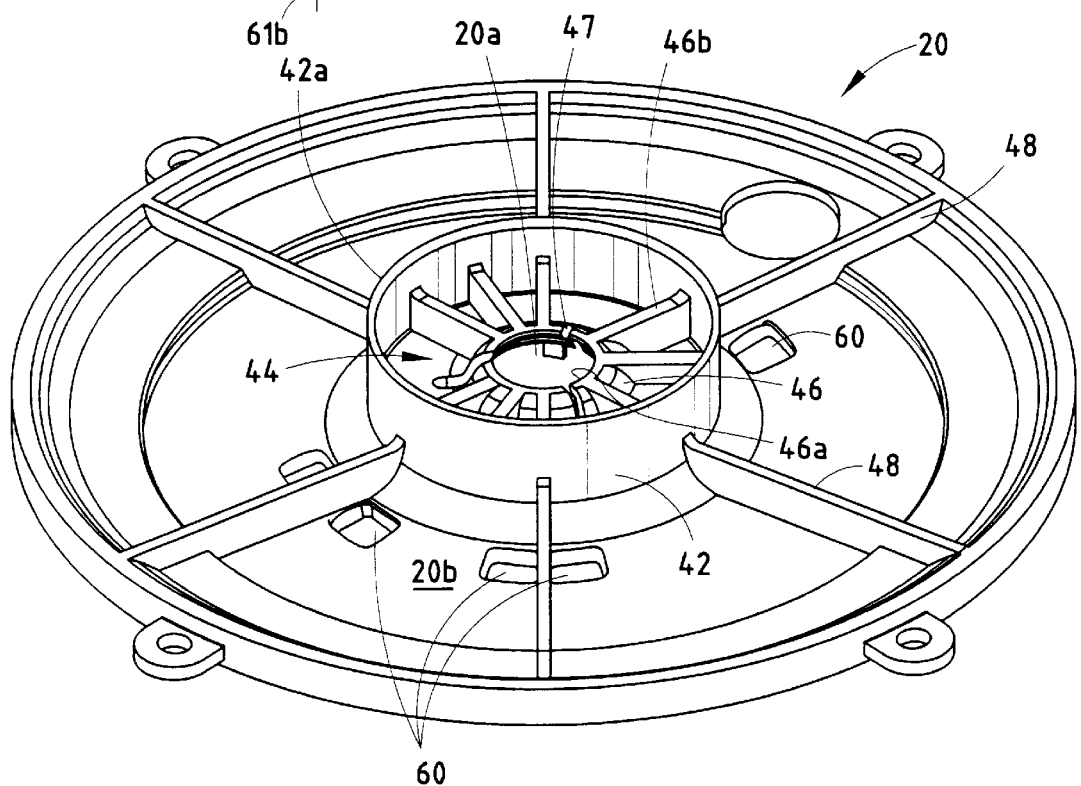
FIG. 5 is a perspective view of an adapter member of the manually adjustable support showing the back surface of the adapter member.

In order to reduce the movement or play between adapter member 20 and fixed member 18, adapter member 20 is provided with a plurality of radially extending projecting members, such as projecting ribs or anti-rotation ribs 48 on back side 20b of adapter member 20 (FIG. 5). Radially extending projecting ribs 48 are circumferentially spaced around cylindrical member 42 of adapter member 20 and are aligned with corresponding circumferentially spaced grooves or recesses 50 provided the on the free end of cylindrical member 23 of fixed member 18 (FIGS. 2 and 3). Furthermore, fixed member 18 preferably includes a plurality of projecting tabs 58 (FIG. 3) which are positioned on either side of selected grooves 50 and extend into corresponding apertures 60 provided on adapter member 20 (FIGS. 2 and 5). In this manner, when adapter member 20 is pivoted about fixed member 18, at least one radially extending rib 48 will extend into a corresponding groove 50 to limit relative rotation of adapter member 20 with respect to fixed member 18 due to vibration and external forces, such as wind which strikes the rearview mirror assembly. Furthermore, at least one pair of projecting tabs 58 extend into apertures 60 provided on adapter member 20 to prevent rotation and may also reduce the play and vibration between adapter member 20 and fixed member 18. With this arrangement, adapter member 20 is restrained from rotation about a first axis 61a (FIG. 4), which extends along the axis of locking pin 28, and yet is free to rotate about any one of an infinite number of second axes 61b which are co-planar with one another and extend generally orthogonal to first axis 61a. A representative one of the second axes 61b is shown in FIG. 4.

Figure 6:
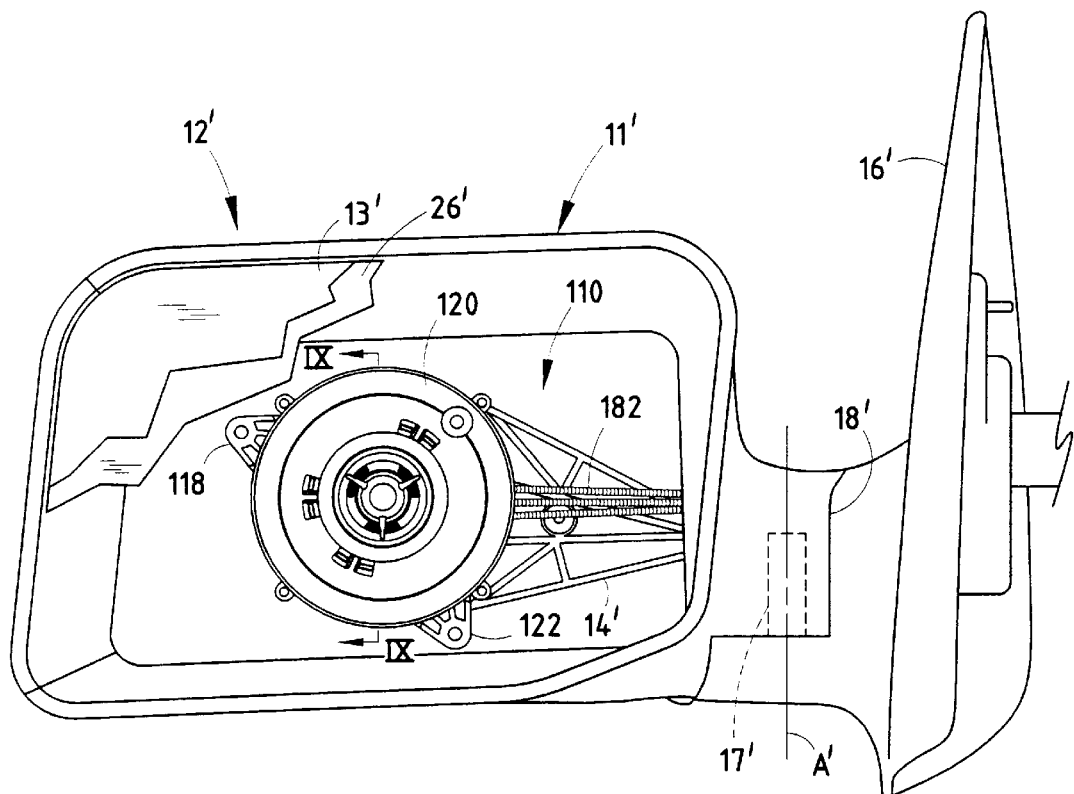
FIG. 6 is a front elevation of a second embodiment of the adjustable support for a reflective element shown mounted in an exterior rearview mirror assembly.

Referring to FIG. 6, a second embodiment 110 of the adjustable support is shown mounted in modular housing 11' of exterior rearview mirror assembly 12'. Bracket 14' is, in turn, secured to housing 11' and may preferably pivot about axis A' on pivot member 17' to break away from vehicle attachment 16' along line 18' to fold inwardly toward the vehicle if struck or impacted. In a similar manner to the first embodiment, adjustable support 110 includes an adapter member 120, which supports reflective element 13', and a fixed member 118. Fixed member 118 is mounted to bracket 14' by a plurality of suitable fasteners which extend through respective mounting bosses 122 of fixed member 118. Similar to the first embodiment, adapter member 120 is adapted to pivot relative to fixed member 118 about one or more axes to provide multi-axis positioning of reflective element 13' in housing 11'.

Figure 7:
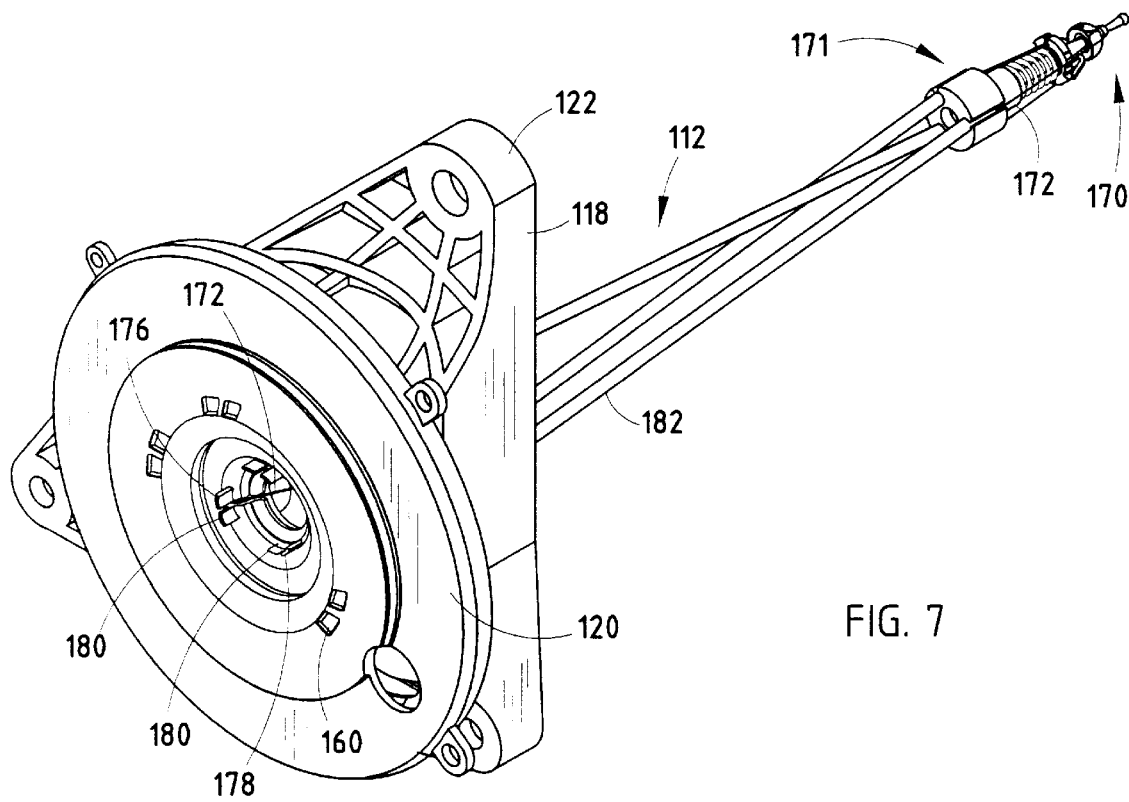
FIG. 7 is a perspective view of the adjustable support assembly of FIG. 6.
Figure 8:
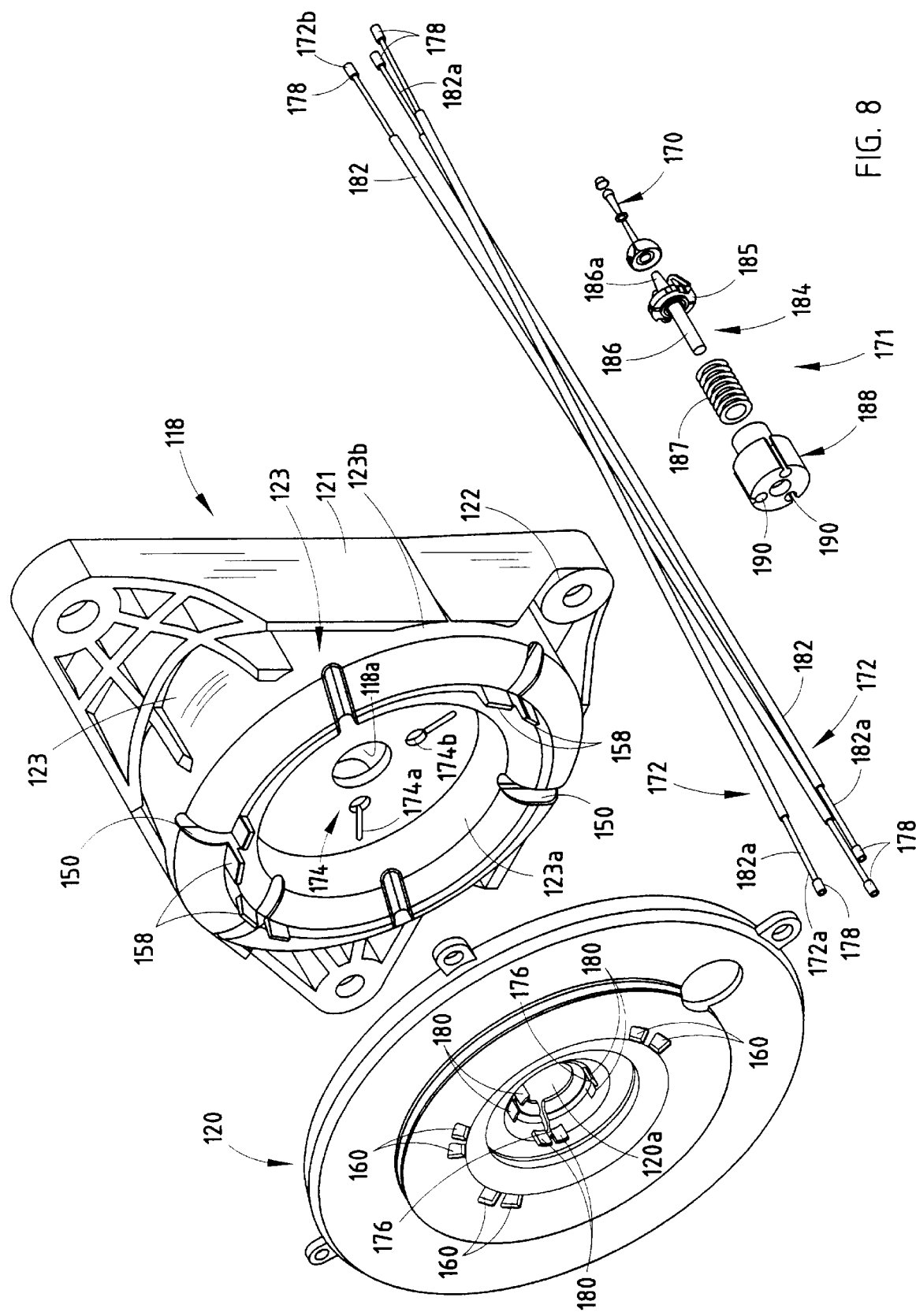
FIG. 8 is an exploded perspective view of the components of the adjustable support of FIG. 6.

In this embodiment, adjustable support 110 is moved by a manual actuator which includes a remotely located manual input lever or actuator 170 (FIGS. 7 and 8). Input lever 170 is typically mounted in the interior of the vehicle. As best seen in FIG. 7, the manual actuator 112 includes a control assembly 171 and a plurality of coaxial cables or cable assemblies 172 which are secured at one end to adapter member 120 and secured at their other ends to control assembly 171 and input lever 170. Each cable assembly 172 includes a cable conduit 182, a wire strand 182a, which extends through cable conduit 182, and a pair of stops 178 mounted to the ends of wire strand 182a. Cable assemblies 172 are initially extended through a central opening 120a of adapter member 120 and then inserted into apertures 176 through elongate, radial passageways 176a that connect apertures 176 to central opening 120a. When inserted into apertures 176, cable assemblies 172 are then seated and secured in place by stops 178, which are provided on the ends 172a of the respective wire strands 180a (FIG. 8). Preferably, positioned on either side of slotted apertures 176 are spaced, side-by-side retaining flanges 180, which retain stops 178 in place when cable assemblies 172 are inserted into apertures 176. Flanges 180 are spaced apart less than the width of stops 178, but slightly more than the width of wire strands 182a in order to permit the wire strand of a respective cable assembly 172 to be inserted into opening 176 between flanges 180. Cable assemblies 172 then extend through circumferentially spaced apertures 174 provided in fixed member 118 (FIGS. 8, 13, and 15) and to control assembly 171 to couple adapter member 120 to fixed member 118 as will be more fully described below.

As best seen in FIGS. 13 and 15, apertures 174 in fixed member 118 are each generally keyhole shaped and include a slotted portion 174a and an enlarged portion 174b which permits insertion of cable assemblies 172 through aperture 174. Once cable assemblies 172 are anchored to adapter member 120, cable assemblies 172 are moved into the smaller slotted portions 174a of apertures 174 of fixed member 118 to thereby retain cable conduits 182 therein.

As best seen in FIGS. 7 and 8, control assembly 171 includes a central member 184, which includes a shaft portion 186, and a collar 188. Central member 184 includes a flange 185 with collar 188 movably and telescopingly mounted on shaft portion 186 of central member 184 and biased away from flange 185 by a coil spring 187. Wire strands 182a and cable conduits 182 extend into respective apertures 190 provided in collar 188 of control assembly 171. Apertures 190 are of stepped construction to retain cable conduits 182 in collar 188 while permitting wire strands 182a to extend through collar 188 and through flange 185 to input lever 170. Input lever 170 is mounted on the distal end 186a of the second end of shaft 186 in a ball and socket arrangement, with the opposed distal ends of cable assemblies 172 being anchored to input lever 170 by enlarged stops 172b. Cable conduits 182, therefore, extend between fixed member 118 and collar 188 of control assembly 171 and act as spacers, maintaining a fixed distance between fixed member 118 and collar 188 of control assembly 171 such that as input lever 170 is pivoted about the distal end 186a of shaft 186, wire strands 182a are pushed and pulled through cable conduits 182 to pivot adapter member 120 on fixed member 118 about a plurality of axes. The force of spring 187, which is compressed when cable assembly ends 172*a*, 172*b* are all connected, as described above, pulls and urges adapter member 120 toward fixed member 118 through wire strands 182*a* such that the two members are held tightly together. Cable assemblies 172, therefore, enable remote manual adjustment of adapter member 120 with respect to fixed member 118 through manual manipulation of input lever 170. Preferably, actuator 112 includes three cable assemblies 172 which extend between adapter member 120 and control assembly 171, and which are equally spaced around aperture 118*a* as shown in FIGS. 13 and 15. Furthermore, cable assemblies 172 and control assembly 171 preferably comprise Bowden cable assemblies which are commercially available from Tutlill Ltd. of England or Vofa Spa of Spain.

Figure 9:
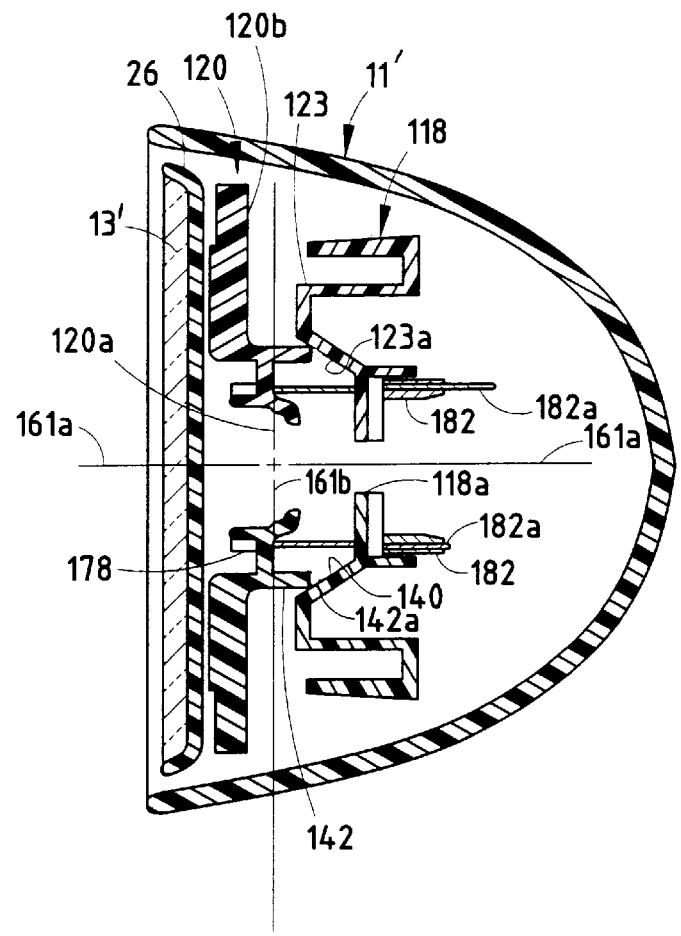
FIG. 9 is a cross-section view taken along line IX—IX of FIG. 6.
Figure 10:
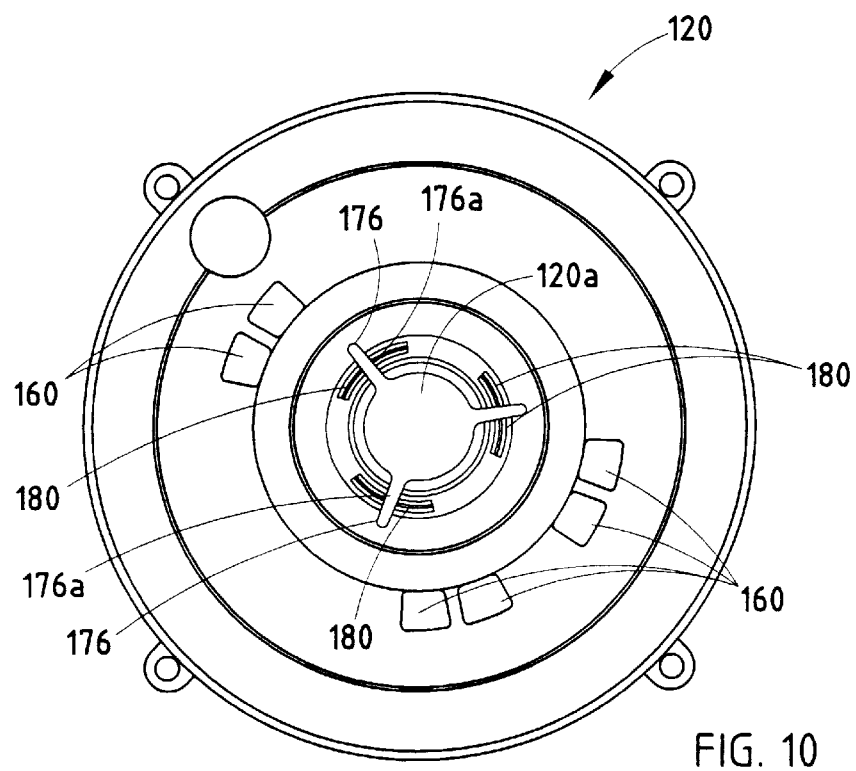
FIG. 10 is a front elevation of the adapter member of the adjustable support of FIG. 6.
Figure 11:
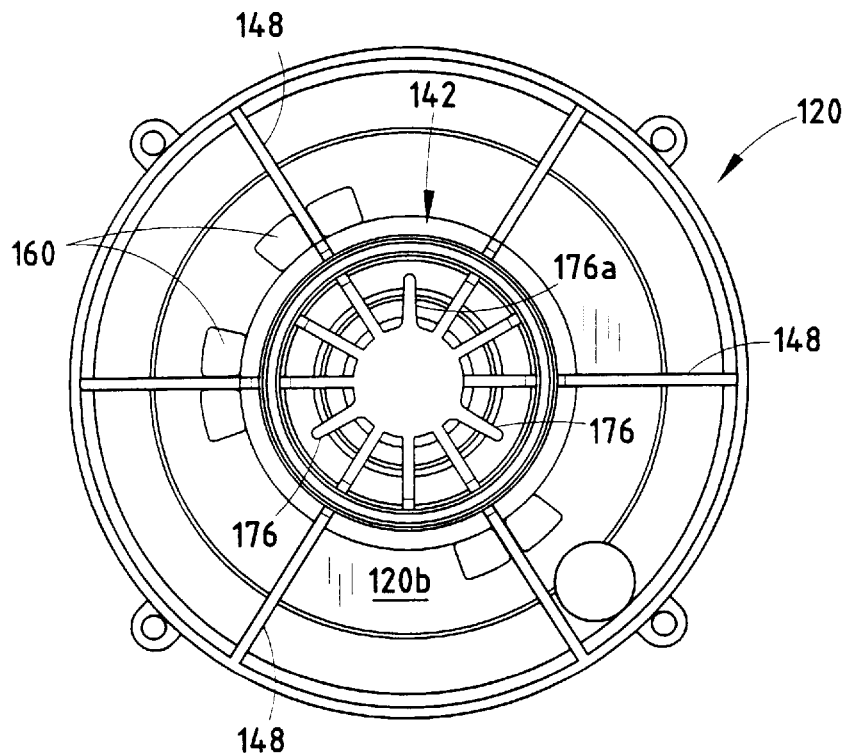
FIG. 11 a rear elevation of the adapter member FIG. 10.
Figure 12:
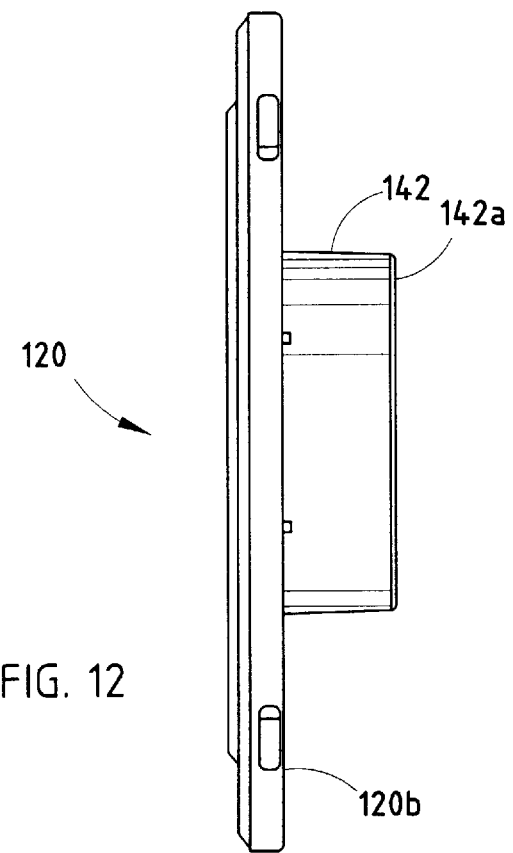
FIG. 12 a side elevation of the adapter member of FIG. 10.

In a similar manner to the first embodiment, adapter member 120 includes a cylindrical member 142 (FIGS. 9, 11, and 12), which projects from a back surface 120*b* of adapter member 120. Fixed member 118 similarly includes a cylindrical member 123 with an arcuate bearing surface 123*a*, which is contacted by an annular bearing surface 142*a* of cylindrical member 142 to permit multi-axis positioning of adapter member 120 with respect to fixed member 118. As shown in FIG. 9, cylindrical member 142 provides an annular line bearing contact between adapter member 120 and fixed member 118, which is defined between the outer peripheral edge of the free end of cylindrical member 142 and arcuate bearing surface 123*a*.

In a manner similar to that in assembly 10 above, and to reduce the movement or play between adapter member 120 and fixed member 118, adapter member 120 includes a plurality of radial extending positioning or anti-rotation ribs 148 (FIG. 11) which cooperate with corresponding circumferentially spaced grooves or slots 150 (FIGS. 8, 13, and 14), which are provided in cylindrical member 123 of fixed member 118. Fixed member 118 may also include projecting tabs 158 which cooperate with corresponding apertures 160 provided in adapter member 120 to reduce the play between adapter member 120 and fixed member 118 over a greater range of motion. In this manner, regardless of the position of the adapter member 120 with respect to fixed member 118, at least one positioning rib 148 is engaged with fixed base 118 and at least one tab 158 is engaged with adapter member 120 to limit the play and vibration between the two members. While limiting rotation about axis 161*a*, ribs 148 allow adjustment around an infinite number of pivot axes 161*b* which are coplanar but orthogonal to axis 161*a* (FIG. 9).

Figure 16:
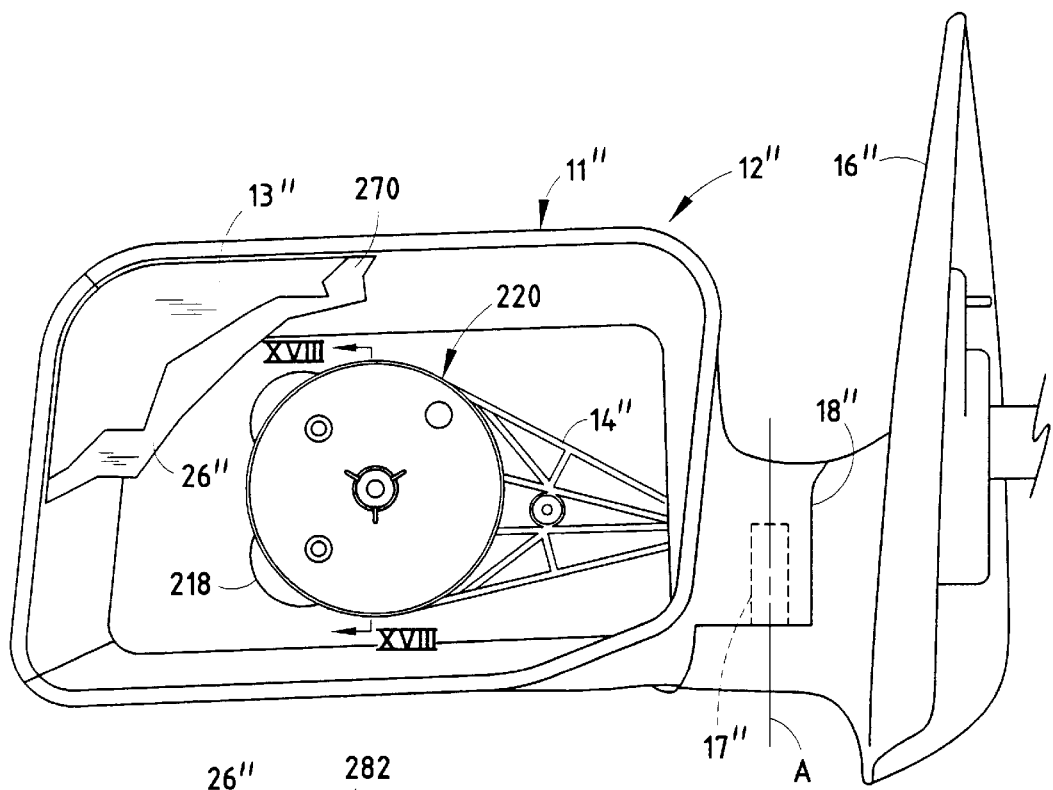
FIG. 16 is a front elevation of a third embodiment of the adjustable support mounted in an exterior rearview mirror assembly.

Referring to FIG. 16, a third embodiment 210 of the adjustable support is shown mounted in modular housing 11" of exterior rearview mirror assembly 12". In this embodiment adjustable support 210 includes an adapter member 220 and a fixed member which comprises a housing 218 of an electrical actuator assembly 270. Actuator assembly 270 is secured to bracket 14" by plurality of threaded fasteners which extend through mounting bosses 272 provided on housing 218 of actuator assembly 270. Bracket 14" is preferably pivotally mounted with respect to mirror attachment 16" on pivot member 17" on axis A" such that it will fold at line 18" toward the vehicle when struck or impacted just as in embodiments 10 and 110. Actuator housing 218 preferably includes a split construction housing having a first or base housing member 218*a* and a second or upper housing member 218*b*. Actuator housing 218 may also comprise a single molded member having a living hinge that divides the member into two sections which fold to form an enclosure, for example a clam shell housing. Preferably, housing 218 is molded from a non-conductive material, such as resinous plastic.

Figure 17:
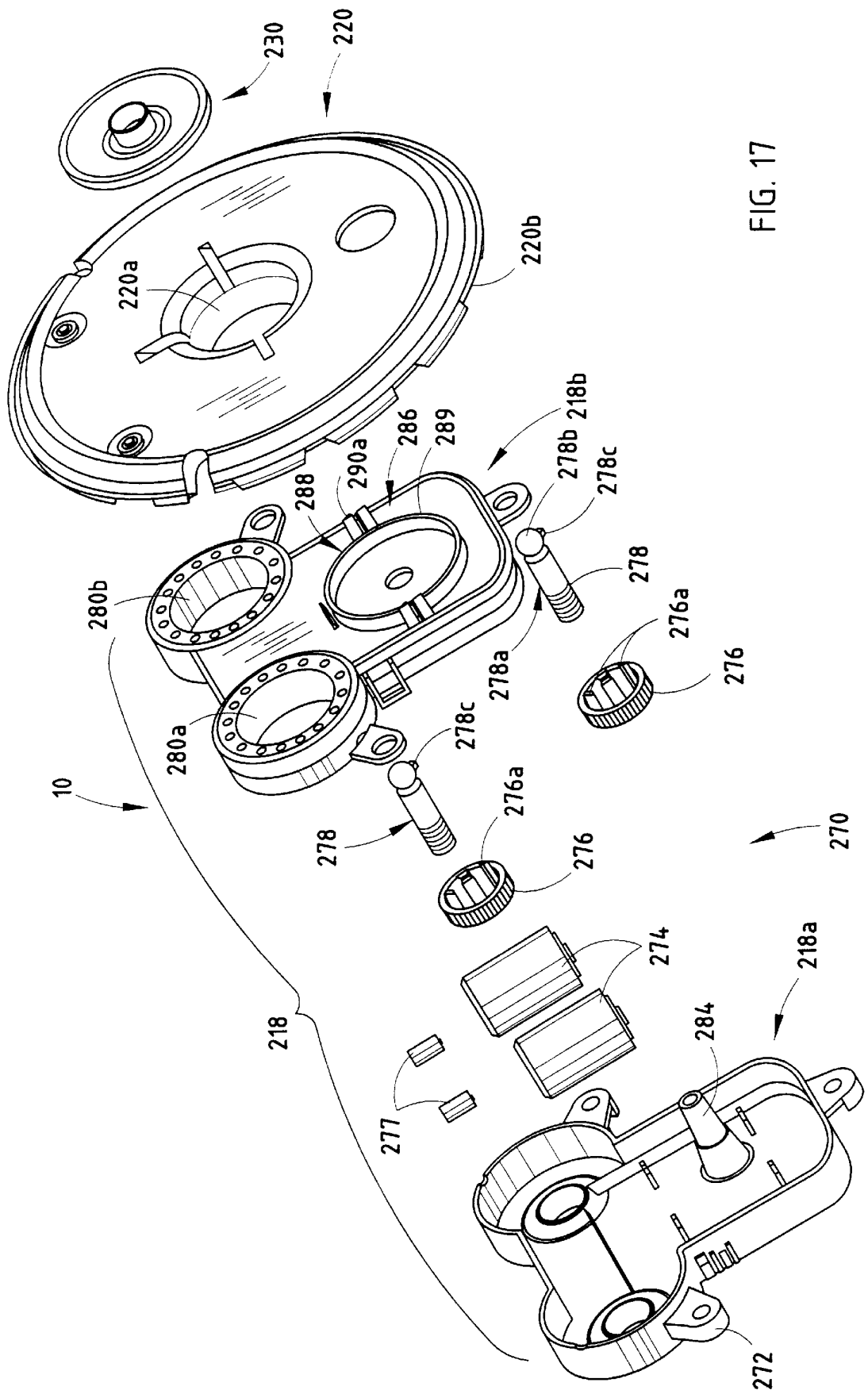
FIG. 17 is an exploded perspective view of the adjustable support of FIG. 16.

As best seen in FIG. 17, first or base housing 218*a* supports a pair of motors 274 and respective gearing 276. Motors 274 include motor drive shafts with worm gears 277 which drive gearing 276. Gearing 276 includes protecting arm members 276*a* with each member 276*a* including a thread formed at its respective end for engaging corresponding threads formed on drive screws 278. When gearing 276 is driven by motors 274, protecting arm members 274*a* rotate and cause drive screws 278 to extend or retract into actuator housing 218 through respective openings 280*a* and 280*b* of upper housing 218*b* to adjust the position of adapter member 220. Openings 280*a* and 280*b* preferably include rubber boots 281 which seal against openings 280*a* and 280*b* and the end portions 278*a* of drive screws 278 to prevent debris and moisture from entering the interior of actuator assembly 270. As drive screws 278 move in and out of actuator housing 218 end portions 278*a* of drive screws 278 extend and retract through openings 280*a* and 280*b* and through boots 281 to push and pull on the back surface 220*b* of adapter member 220.

Figure 18:
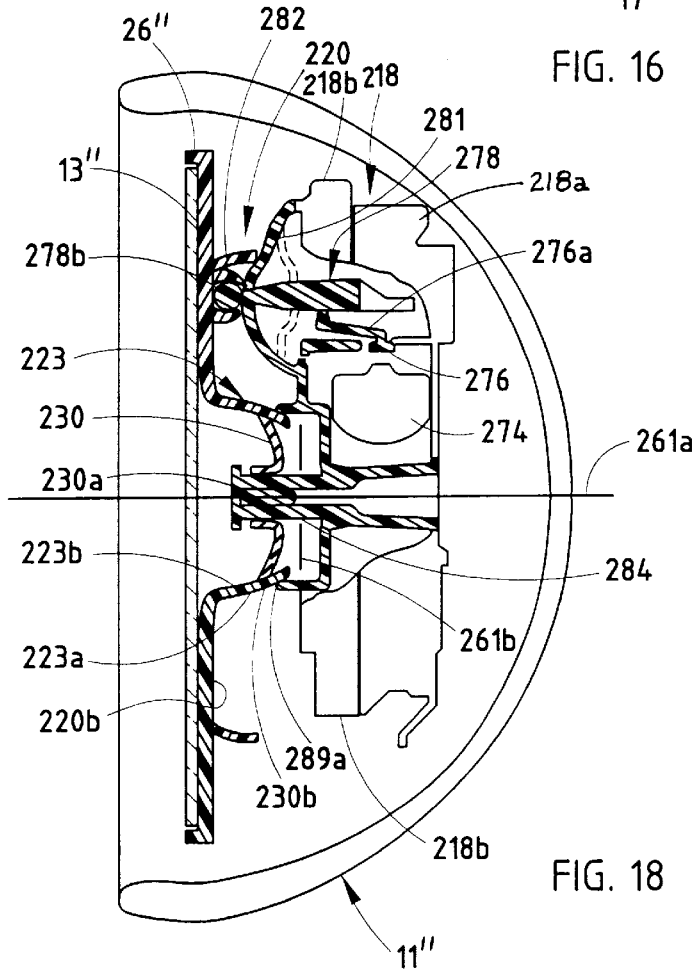
FIG. 18 is a cross-section view taken along line XVIII—XVIII of FIG. 16.

As best seen in FIGS. 17 and 18, end portions 278*a* of the drive screws 278 include large spherical distal ends 278*b* which engage corresponding socket structures 282 provided on the back surface 220*a* of adapter member 220. To prevent end portions 278*a* from rotating in socket structures 282, distal ends 278*b* include transverse pins 278*c* which seat in socket structures 282. These ball and socket connections permit adapter member 220 to be supported and moved by drive screws 278 but to be free to pivot about the distal ends of drive screws 278. Furthermore, the ball and socket connections may restrain adapter member 120 from rotating about an axis 261*a* (FIG. 18) which is orthogonal to pivot axes 261*b* (FIG. 18). Although only one representative pivot axis 261*b* is illustrated, it should be understood that adapter member 220 is preferably adjustable about an infinite number of pivot axis 261*b* which are defined by the multiple positions of the drive screws 278. For further details of the operation of actuator assembly 218. Reference is made herein to pending U.S. patent application entitled HOUSING WITH INTEGRAL WEATHER SEALS AND NOISE DAMPENERS FOR A REARVIEW MIRROR ACTUATOR ASSEMBLY filed on Apr. 14, 1997, Ser. No. 08/838,008, now U.S. Pat. No. 5,986,364 by Robert E. Bingle, David Kevin Willmore, and Robert E. Schnell, assigned to Donnelly Corporation of Holland, Mich., which is incorporated herein by reference in its entirety.

As shown in FIG. 17, housing 218*a* includes a projecting member 284 which extends through a pivot structure 286 on upper housing 218*b*. Pivot structure 286 cooperates with adapter member 220 to provide multi-axis positioning of adapter member 220 reflective element 13". Pivot structure 286 comprises an annular flange 288, which defines a cylindrical wall 289 and which engages or rides on an outer surface of an arcuate bearing surface 223*a*, provided on adapter 220. Arcuate bearing surface 223*a* is provided by a socket structure 223 which projects from the back side 220*b* of adapter member 220. Cylindrical wall 289 includes an annular line bearing surface 289*a* which is defined by the inner peripheral edge on the free end of cylindrical wall 289 and which provides an annular line contact between upper housing 218*b* and adapter member 220. Adapter member 220 is secured to actuator housing 218 by locking cap 230, which is secured by a fastener 230*a* or a spring (not shown) or the like to the distal end of projecting member 284. Furthermore, as best seen in FIG. 18, locking cap 230 includes an annular line bearing surface 230b which rides on the inner arcuate bearing surface 223b of socket member 223 to similarly provide an annular line bearing contact between locking cap and adapter member 220. The two annular line contacts together stabilize mirror element 13" and backing plate 26" and reduce vibration while allowing pivotal movement about an infinite number of coplanar pivot axes 261b as guided by drive screws 278. As described previously, the spaced pair of drive screws may resist rotation about pivot axis 261a which is orthogonal to axes 261b.

While several forms of the invention have been shown and described, other forms will now become apparent to those skilled in the art. For instance, the arcuate bearing surface and the annular line bearing surface may be respectively molded or formed on the adapter member and the fixed space member of the manually adjustable supports, in a manner similar to that illustrated in the third embodiment. Moreover, adapter plate 20 may be integrally molded with the reflective element holder 26. Furthermore, although the electrically actuated support is illustrated with two motors, the electrically actuated support may alternately include a single motor and provide multi-axis positioning about a single pivot point, as opposed to the multiple pivot points provided in the two motor electrical actuator.

Embodiments of the invention shown in the drawings and described above are not intended to limit the scope of the invention which is described by the claims which follow:

1. An adjustable support for a reflective element of a rearview mirror assembly, the adjustable support comprising:
   an adapter member adapted to support the reflective element;
   a fixed member, and
   at least one connecting member urging said adapter member into bearing contact with said fixed member, one of said adapter member and said fixed member having an arcuate bearing surface and the other of said adapter member and said fixed member having a peripheral edge defining a non-spherical surface, said non-spherical surface engaging said arcuate bearing surface only at said edge to form an annular line bearing contact between said adapter member and said fixed member to permit multi-axis adjustment of the position of the reflective element and enhanced uniform movement between said adapter member and said fixed member and enhanced control over said movement.

2. The adjustable support according to claim 1, wherein said other of said adapter member and said fixed member includes a cylindrical member extending therefrom, said cylindrical member including a distal end, and said distal end including said peripheral edge.

3. The adjustable support according to claim 1, wherein one of said adapter member and said fixed member includes at least one projecting member and the other of said adapter member and said fixed member includes a corresponding recess, said projecting member cooperating with said corresponding recess to limit relative rotation of said adapter member about a first axis of said fixed member but to permit said adapter member to rotate about a second axis of said fixed member, and said first axis being generally orthogonal to said second axis.

4. The adjustable support according to claim 3, wherein said projecting member comprises a rib.

5. The adjustable support according to claim 4, wherein one of said adapter member and said fixed member includes a plurality of projecting members and the other of said adapter member and said fixed member includes a plurality of corresponding recesses.

6. The adjustable support according to claim 5, wherein said projecting members are arranged in a spaced apart radial arrangement on said one of said adapter member and said fixed member.

7. The adjustable support according to claim 5, wherein said adapter member includes a first side facing said fixed member, said projecting members being arranged on said first side of said adapter member, said recesses being formed on said fixed member, and at least one of said projecting members engaging a respective cooperating recess to limit movement between said adapter member and said fixed member.

8. The adjustable support according to claim 5, wherein said fixed member includes a cylindrical member extending toward said adapter member, said cylindrical member defining said arcuate bearing surface and including said corresponding recesses.

9. The adjustable support according to claim 8, wherein said cylindrical member includes an annular wall, said corresponding recesses being formed in said annular wall.

10. The adjustable support according to claim 9, wherein said annular wall includes a free end, said corresponding recesses being formed in said free end of said annular wall.

11. The adjustable support according to claim 1, wherein said adapter member comprises a plate member.

12. The adjustable support according to claim 1, wherein said fixed member comprises an electrical actuator housing.

13. The adjustable support according to claim 12, wherein the electrical actuator housing includes a cylindrical wall defining said non-spherical surface, said adapter member having said arcuate bearing surface, and said non-spherical surface engaging said arcuate bearing surface to form said annular line bearing contact permit to multi-axis adjustment of the position of the reflective element.

14. The adjustable support according to claim 13, wherein said electrical actuator housing further includes a projecting member extending between said cylindrical wall, said adapter member being secured to said electrical actuator housing by a fastener, and said fastener extending into said projecting member.

15. The adjustable support according to claim 14, further comprising a locking cap, said fastener extending through said locking cap to secure said adapter member to said electrical actuator housing, and said locking cap having a non-spherical surface engaging said adapter member.

16. The adjustable support according to claim 1, wherein said adapter member is biased toward said fixed member by at least one spring.

17. The adjustable support according to claim 16, wherein said adapter member is secured to said fixed member by a coupler, said coupler having an enlarged end having an arcuate bearing surface, and said adapter member engaging said arcuate bearing surface of said coupler.

18. The adjustable support according to claim 17, wherein said adapter member includes a second non-spherical surface, said second non-spherical surface engaging said arcuate bearing surface of said coupler to permit multi-axis adjustment of the position of said adapter member and the reflective element supported thereon.

19. The adjustable support according to claim 1, further comprising a plurality of cables, said adapter member being urged toward said fixed member by said plurality of cables, said cables being secured at one end to said adapter member and extending through said fixed member to a remote manual actuator, said cables being tensioned between said fixed member and said actuator by a spring, said spring being positioned in said remote manual actuator, said remote manual actuator permitting remote manual adjustment of the position of said reflective mirror element in said housing.

20. The adjustable support according to claim 19, wherein said cables support elongate cable housings extending between said fixed member and said actuator.

21. The adjustable support according to claim 19, wherein said plurality of cables comprise coaxial cables.

22. The adjustable support according the claim 1, wherein said arcuate bearing surface comprises a semi-spherical bearing surface.

23. A rearview mirror assembly comprising:
   a housing;
   a reflective element;
   an adapter member supporting said reflective element in said housing; and
   a fixed member supported in said housing, said adapter member being urged into bearing contact with said fixed member, one of said adapter member and said fixed member having an arcuate bearing surface and the other of said adapter member and said fixed member having a distal end, said distal end having an outer perimeter at an outer edge defining an outermost non-spherical surface, and said non-spherical surface being urged against and contacting said arcuate bearing surface only at said edge thereby forming an annular line bearing contact between said adapter member and said fixed member to permit multi-axis adjustment of the position of said reflective element in said housing and enhanced uniform movement between said adapter member and said fixed member and enhanced control over said movement.

24. The rearview mirror assembly according to claim 23, wherein said adapter member includes a forward mounting surface, a rearward surface, and a cylindrical member extending from said rearward surface, said cylindrical member including said distal edge defining said outer edge.

25. The rearview mirror assembly according to claim 23, wherein said adapter member includes a plurality of circumferentially spaced projecting members and said fixed member includes a plurality of corresponding recesses, said projecting members cooperating with said corresponding recesses to limit relative rotation of said adapter member about a first axis of said fixed member but to permit said adapter member to rotate about a second axis of said fixed member, and said first axis being generally orthogonal to said second axis.

26. The rearview mirror assembly according to claim 25, wherein said projecting members comprise radially extending ribs.

27. The rearview mirror assembly according to claim 25, wherein said fixed member includes a cylindrical member, said corresponding recesses being formed in said cylindrical member.

28. The rearview mirror assembly according to claim 23, wherein said adapter member comprises a plate member.

29. The rearview mirror assembly according to claim 23, wherein said fixed member comprises an electrical actuator housing.

30. The rearview mirror assembly of claim 29, wherein said electrical actuator housing includes a pivot structure, said pivot structure including said non-spherical surface, said adapter member including said arcuate bearing surface and being coupled to said electrical actuator housing by a fastener, and said fastener extending into said pivot structure to thereby urge said non-spherical surface of said actuator housing into contact with said arcuate bearing surface of said adapter member.

31. The rearview mirror assembly of claim 30, further comprising a locking cap having a second non-spherical surface, said adapter member including a socket member having an outer surface defining said arcuate bearing surface and having an inner surface defining a second arcuate bearing surface, said fastener securing said locking cap to said adapter member whereby said second non-spherical surface engages said second arcuate bearing surface to reduce vibrational movement between said adapter member and said electrical actuator housing.

32. The rearview mirror assembly according to claim 23, wherein said adapter member is biased toward said fixed member by at least one spring.

33. The rearview mirror assembly according to claim 32, wherein said spring comprises a locking cap.

34. The rearview mirror assembly according to claim 23, further comprising a plurality of cables, said adapter member being urged toward said fixed member by said plurality of cables, said cables being secured at one end to said adapter member and extending through said fixed member to a remote manual actuator, said cables being tensioned between said fixed member and said actuator by a spring, said spring being positioned in said remote manual actuator, said remote manual actuator permitting remote manual adjustment of the position of said reflective mirror element in said housing.

35. The rearview mirror assembly according to claim 34, wherein said cables support elongate cable housings extending between said fixed member and said actuator.

36. The rearview mirror assembly according to claim 34, wherein said plurality of cables comprise coaxial cables.

37. The rearview mirror assembly according to claim 23, wherein said adapter member is secured to said fixed member by a coupler, said adapter member including a second non-spherical surface, and said coupler including a second arcuate bearing surface engaging said second non-spherical surface of said adapter member to reduce vibrational movement between said adapter member and said fixed member.

38. The rearview mirror assembly according to claim 37, wherein said adapter member is urged toward said fixed member by a spring.

39. The rearview mirror assembly according to claim 38, wherein said spring comprises a locking cap, said locking cap engaging said coupler to urge said second arcuate bearing surface into contact with said second non-spherical surface and said adapter member into contact with said fixed member.

40. An adjustable support for a reflective element in a rearview mirror assembly, the adjustable support comprising:
   an adapter member having a first side and a second side, said first side being adapted to support the reflective element, said second side including an outwardly projecting cylindrical wall having an annular edge defining a non-spherical surface;
   a fixed member adapted to be supported in the rearview mirror housing, said fixed member having an arcuate bearing surface; and
   at least one coupler securing said adapter member to said fixed member and urging said non-spherical surface into contact with said arcuate bearing surface only at said edge to provide a line bearing contact between said adapter member and said fixed member, said arcuate bearing surface permitting multi-axis positioning of said adapter member with respect to said fixed member to provide adjustment of the reflective element and enhanced uniform movement between said adapter member and said fixed member and enhanced control over said movement.

41. The adjustable support according to claim 40, wherein said coupler comprises a locking pin, said locking pin extending through a central portion of said adapter member and through a central portion of said fixed member.

42. The adjustable support according to claim 40, wherein said adapter member includes a plurality of circumferentially spaced projecting ribs, said fixed member including a plurality of corresponding recesses, said projecting ribs cooperating with said corresponding recesses to limit relative movement between said adapter member and said fixed member but to permit said adapter member to rotate about an axis of said fixed member.

43. The adjustable support according to claim 40, wherein said fixed member includes a cylindrical member extending toward said adapter member, said cylindrical member including said edge defining said arcuate bearing surface and including said corresponding recesses.

44. The adjustable support according to claim 43, wherein said cylindrical member includes an annular wall, said corresponding recesses being formed in said annular wall.

45. The adjustable support according to claim 40, wherein said projecting member comprises an annular wall, said annular wall including an outer peripheral edge defining said annular edge.

46. The adjustable support according to claim 40, wherein said adapter member comprises a plate member.

47. The adjustable support according to claim 40, wherein said fixed member comprises an electrical actuator housing.

48. The rearview mirror assembly of claim 47, wherein said electrical actuator housing includes a pivot structure, said pivot structure including said non-spherical surface, said adapter member including said arcuate bearing surface and being coupled to said electrical actuator housing by a fastener, and said fastener extending into said pivot structure to thereby urge said non-spherical surface of said actuator housing into contact with said arcuate bearing surface of said adapter member.

49. The rearview mirror assembly of claim 48, further comprising a locking cap having second non-spherical surface, said adapter member including a socket member having an outer surface defining said arcuate bearing surface and having an inner surface defining a second arcuate bearing surface, said fastener securing said locking cap to said adapter member whereby said second non-spherical surface engages said second arcuate bearing surface to reduce vibrational movement between said adapter member and said electrical actuator housing.

50. The adjustable support according to claim 40, wherein said adapter member is biased toward said fixed member by at least one spring.

51. An adjustable support for a reflective element in a rearview mirror assembly, the adjustable support comprising:

an adapter member having a first side and a second side, said first side being adapted to support the reflective element, said second side including an outwardly projecting member having an annular line bearing surface;

a fixed member adapted to be supported in the rearview mirror housing, said fixed member having an arcuate bearing surface, and said adapter member including a plurality of circumferentialy spaced projecting ribs, said fixed member including a plurality of corresponding recesses, said projecting ribs cooperating with said corresponding recesses to limit relative movement between said adapter member and said fixed member but to permit said adapter member to rotate about an axis of said fixed member, and said fixed member including at least one pair of projecting tabs positioned on opposed sides of one of said recesses, said adapter member including a corresponding pair of apertures, said projecting tabs extending into said apertures when said adapter member is rotated with respect to said fixed member to further limit movement between said adapter member and said fixed member; and at least one coupler securing said adapter member to said fixed member and urging said annular line bearing surface into contact with said arcuate bearing surface, said arcuate bearing surface permitting multi-axis positioning of said adapter member with respect to said fixed member to provide adjustment of the reflective element.

52. The adjustable support according to claim 51, wherein said fixed member includes a cylindrical member extending towards said adapter member when said adapter member is secured to said fixed member, said cylindrical member defining said arcuate bearing surface and including said corresponding recesses.

53. The adjustable support according to claim 52, wherein said cylindrical member includes an annular wall, said corresponding recesses being formed in said annular wall.

54. The adjustable support according to claim 51, wherein said projecting member comprises an annular wall, said annular wall including an outer peripheral edge defining said annular line bearing contact.

55. The adjustable support according to claim 51, wherein said fixed member includes an annular wall, said annular wall includes said annular line bearing surface.

56. The adjustable support according to claim 55, wherein said annular wall includes an inner peripheral edge, said inner peripheral edge defining said annular line bearing surface.

57. The adjustable support according to claim 56, wherein said electrical actuator housing includes a pivot structure, said pivot structure including said annular line bearing surface.

58. The adjustable support according to claim 51, wherein said fixed member comprises an electrical actuator housing.

59. The adjustable support according to claim 51, wherein said adapter member is biased toward said fixed member by at least one spring.

* * * * *

UNITED STATES PATENT AND TRADEMARK OFFICE
CERTIFICATE OF CORRECTION

PATENT NO. : 6,168,279 B1
DATED : January 2, 2001
INVENTOR(S) : Robert E. Schnell Page 1 of 1

It is certified that error appears in the above-identified patent and that said Letters Patent is hereby corrected as shown below:

Column 9,
Line 17, delete "space"

Column 10,
Line 31, "the" should be -- said --
Line 35, insert -- to -- before "permit"
Line 35, delete "to" after "permit"

Signed and Sealed this

First Day of February, 2005

JON W. DUDAS
*Director of the United States Patent and Trademark Office*